INVENTOR
S. V. SMITH
BY
ATTORNEY

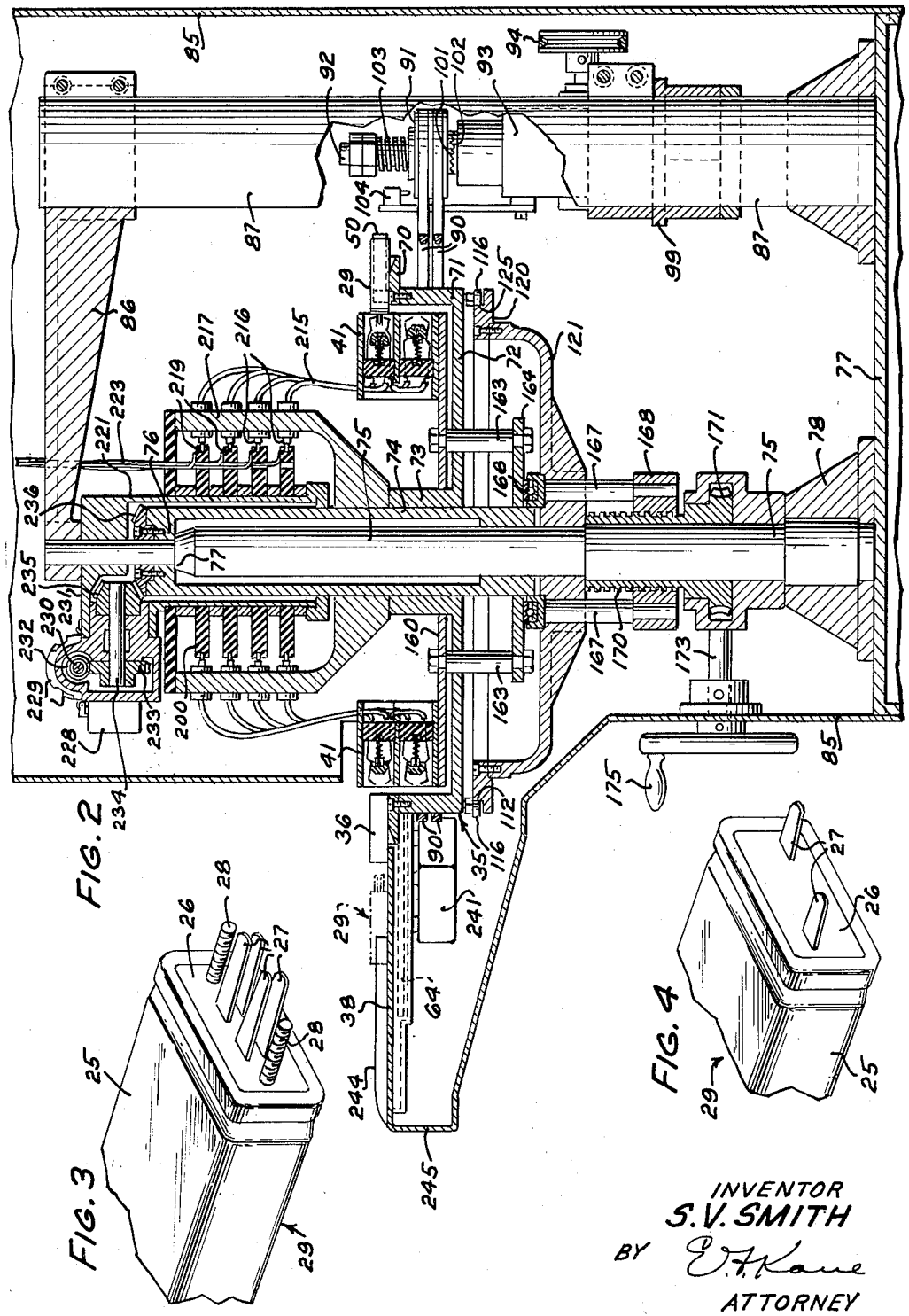

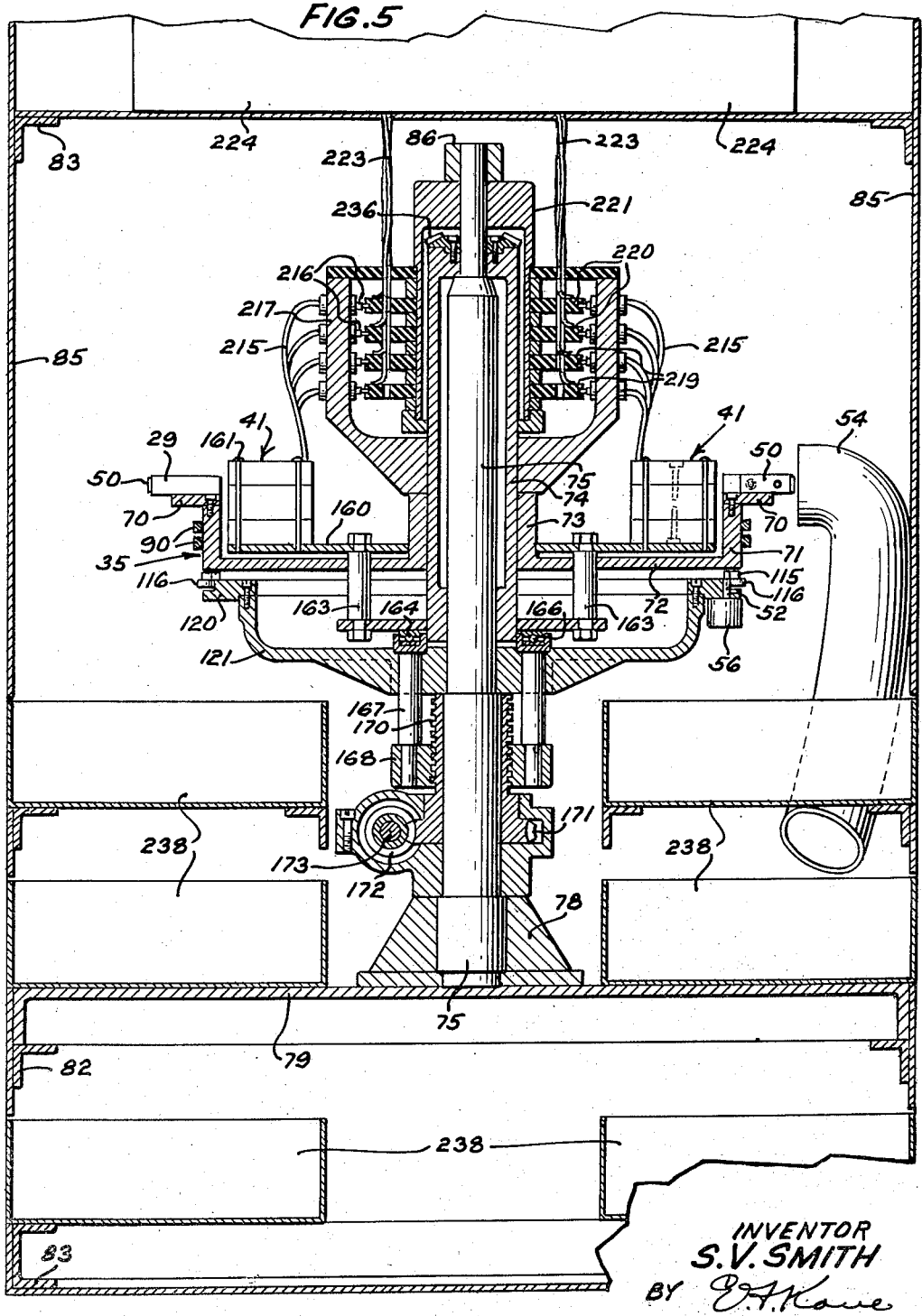

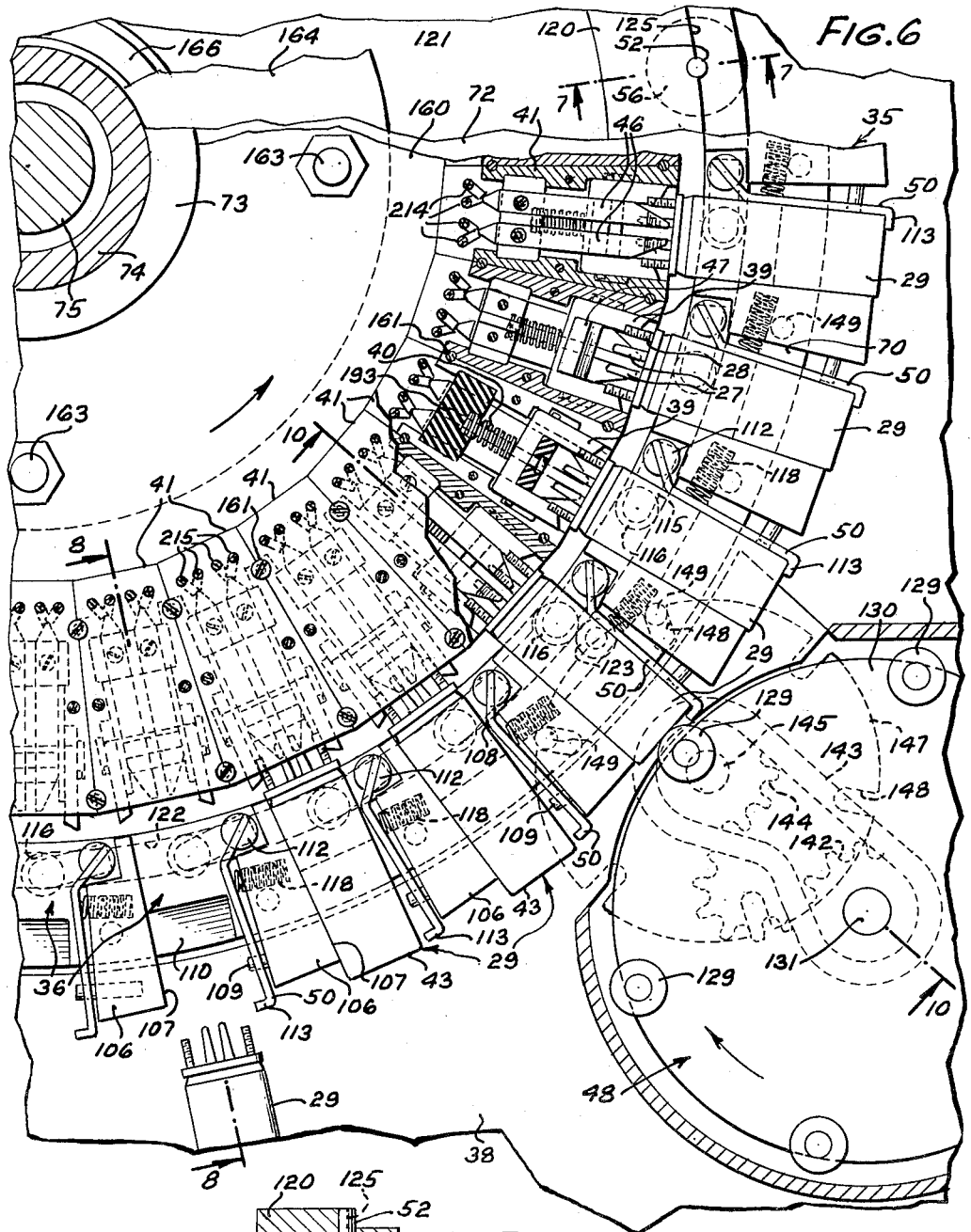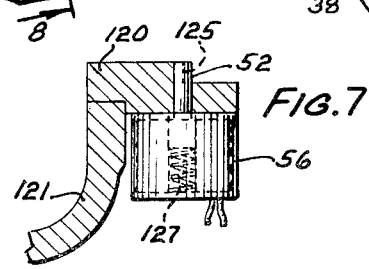

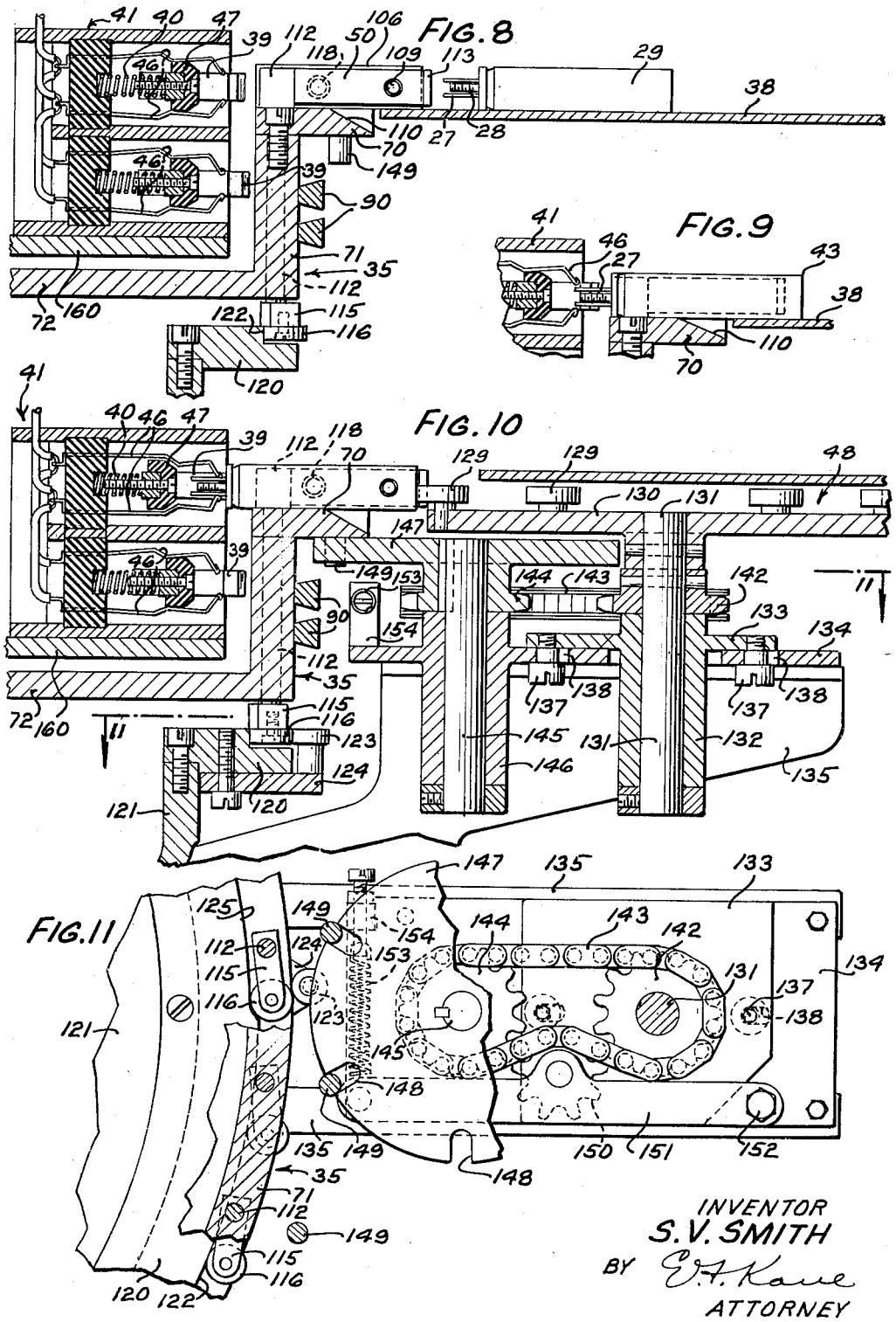

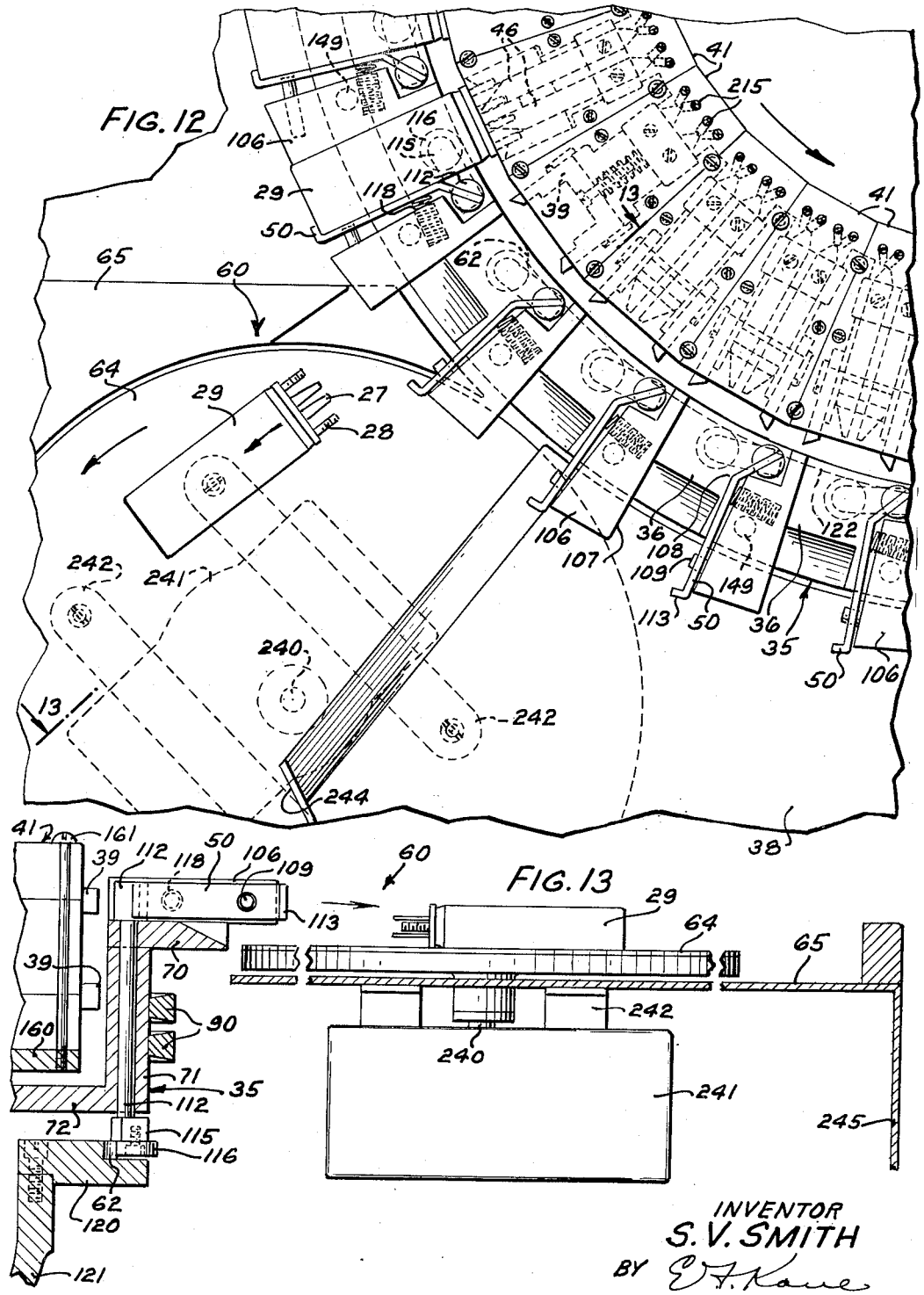

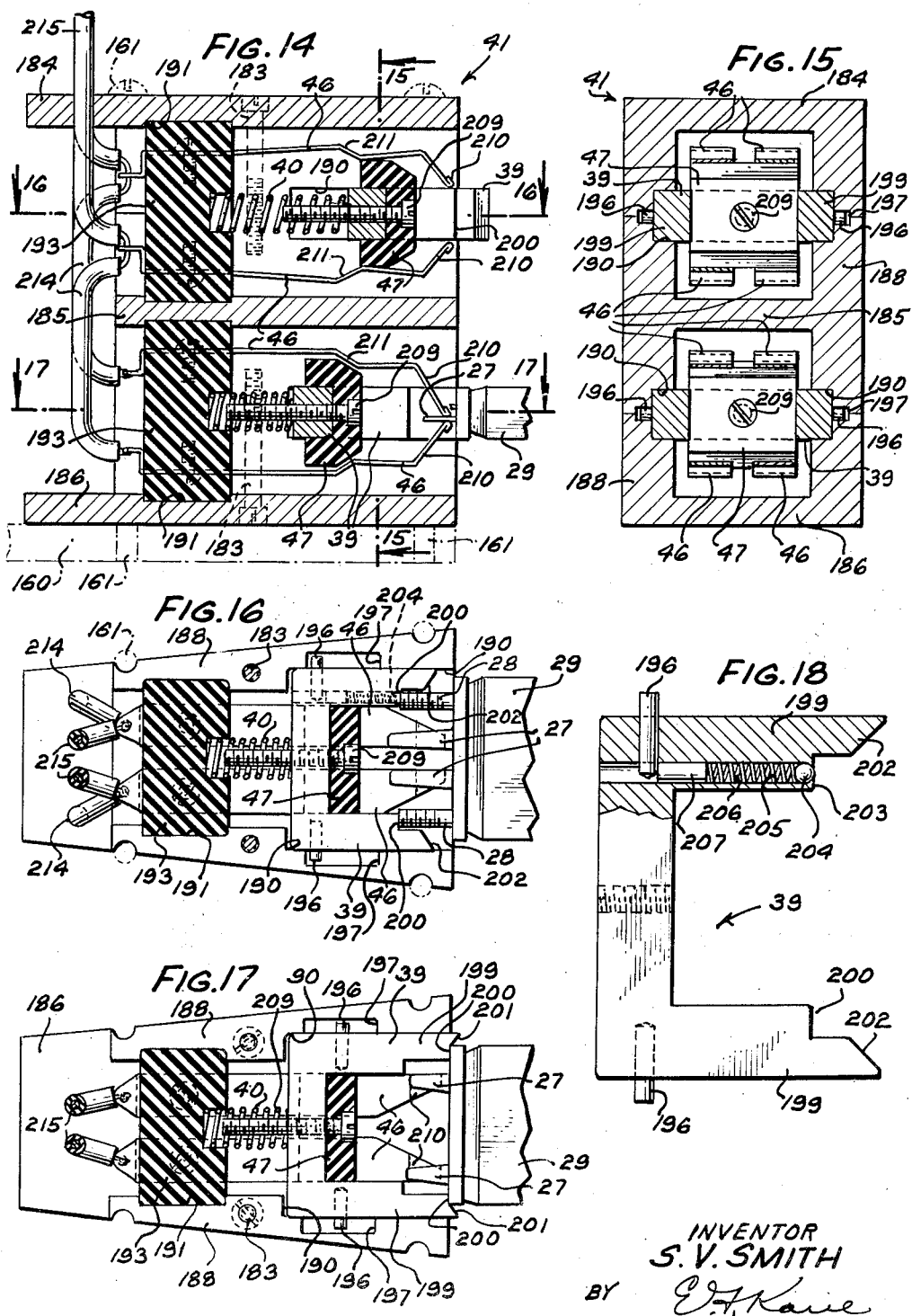

Patented Sept. 11, 1951

2,567,741

UNITED STATES PATENT OFFICE 2,567,741

ARTICLE TESTING AND SORTING APPARATUS

Scott V. Smith, Danville, Ill., assignor, by mesne assignments, to Western Electric Company, Incorporated, New York, N. Y., a corporation of New York Application August 20, 1948, Serial No. 45,385

6 Claims. (Cl. 209—81)

This invention relates to a condenser and network testing apparatus and more particularly to a rotary type machine for applying a series of electrical tests to condensers or networks contained in metal cans and to sort them according to their defects or non-defects.

It is an object of the present invention to provide an effective and efficient apparatus for sorting articles according to qualities thereof.

In one embodiment of the invention, the testing apparatus comprises a continuously rotating turret having a plurality of holders for receiving articles to be tested, a radially movable ejector associated with each holder and stressed to eject the article from the holder, and contacts engageable with the terminals of the article and sequentially connected through commutator and switch means to a plurality of test circuits adapted to apply various tests to the article. The article is placed in a holder in an inoperative position in spaced relation to the contacts and in engagement with the ejector and at a predetermined point in the rotation of the table the article is pushed by a rotating pusher mechanism into an operative position in engagement with the contacts, which movement of the article also moves the ejector to a stressed operative position and the article is held in this position by a spring-pressed latch. As the article moves with the turret, it is sequentially electrically connected to testing circuits and is subjected to various electrical tests, and if the article is defective and does not meet a test, cams located at predetermined positions along the path of travel of the articles actuate the latch and effect the ejection of the article while, if the article passes the test, solenoids under control of the test circuits are energized to render the cams ineffective and allow the article to be carried by the turret to the following test and finally to an unloading station. A perfect or acceptable article passing through the various tests applied to the articles is ejected from the holder at an unloading station by a stationary cam, which operates to release the latches from the articles and cause the ejection of the articles onto a rotating table, which quickly moves the articles out of the path of succeeding ejected articles.

In order to accommodate articles having various thicknesses and constructions of terminals, the fixtures which include the contact members and ejecting members are arranged in two levels and are adjustable to move either level of contact fixtures in alignment with the article holder.

The electrical circuits which control the solenoids may be of any suitable type capable of supplying current to operate the solenoids, but are preferably of the type shown in the copending applications of S. E. Frisbie-G. E. Weeks, Serial Nos. 46,792, 46,793, and 46,794, filed August 30, 1948, the latter two of which have since issued as Patents Nos. 2,507,565 and 2,507,566.

Other objects and advantages of the invention will be apparent by reference to the following description and the accompanying drawings illustrating a preferred embodiment thereof in which Fig. 1 is a plan view of the preferred form of apparatus embodying the invention with a portion of the housing thereof shown in section;

Fig. 2 is a vertical longitudinal sectional view through a portion of the apparatus taken on the line 2—2 of Fig. 1;

Fig. 3 is a view in perspective of an article which may be tested in this apparatus showing the article as having a pair of studs and one arrangement of terminals extending therefrom;

Fig. 4 is a view in perspective of an article which may be tested in this apparatus and which has a different arrangement of terminals extending therefrom;

Fig. 5 is a vertical transverse cross-sectional view of the apparatus taken on the line 5—5 of Fig. 1;

Fig. 6 is a fragmentary plan view of the article loading portion of the apparatus showing a portion of the rotary table for carrying the articles and a portion of the pusher mechanism for moving the article on the rotary table from an inoperative to an operative position thereon;

Fig. 7 is a vertical sectional view taken on the line 7—7 of Fig. 6 showing a movable cam and the solenoid for actuating it;

Fig. 8 is a fragmentary vertical sectional view through a portion of the rotary table and a stationary loading table taken on the line 8—8 of Fig. 6 and showing an article on the loading table in position to be moved into a holder on the rotary table;

Fig. 9 is a fragmentary view of a portion of the apparatus shown in Fig. 8 showing the article moved into inoperative position in a holder on the rotary table and in engagement with the ejector associated therewith;

Fig. 10 is a fragmentary vertical sectional view taken on line 10—10 of Fig. 6 showing the pusher mechanism and an article moved by the pusher into its operative position in engagement with electrical contact springs;

Fig. 11 is a fragmentary plan sectional view of the drive for the pusher mechanism taken on the line 11—11 of Fig. 10;

Fig. 12 is a fragmentary plan view of the unloading portion of the apparatus;

Fig. 13 is a vertical sectional view taken on the line 13—13 of Fig. 12;

Fig. 14 is a detailed vertical longitudinal sectional view through the fixture showing the arrangement of the contact springs and the ejector members therein and an article in operative position relative to the lower contacts and ejector;

Fig. 15 is a vertical transverse sectional view through the fixture taken on the line 15—15 of Fig. 14;

Figure 1:
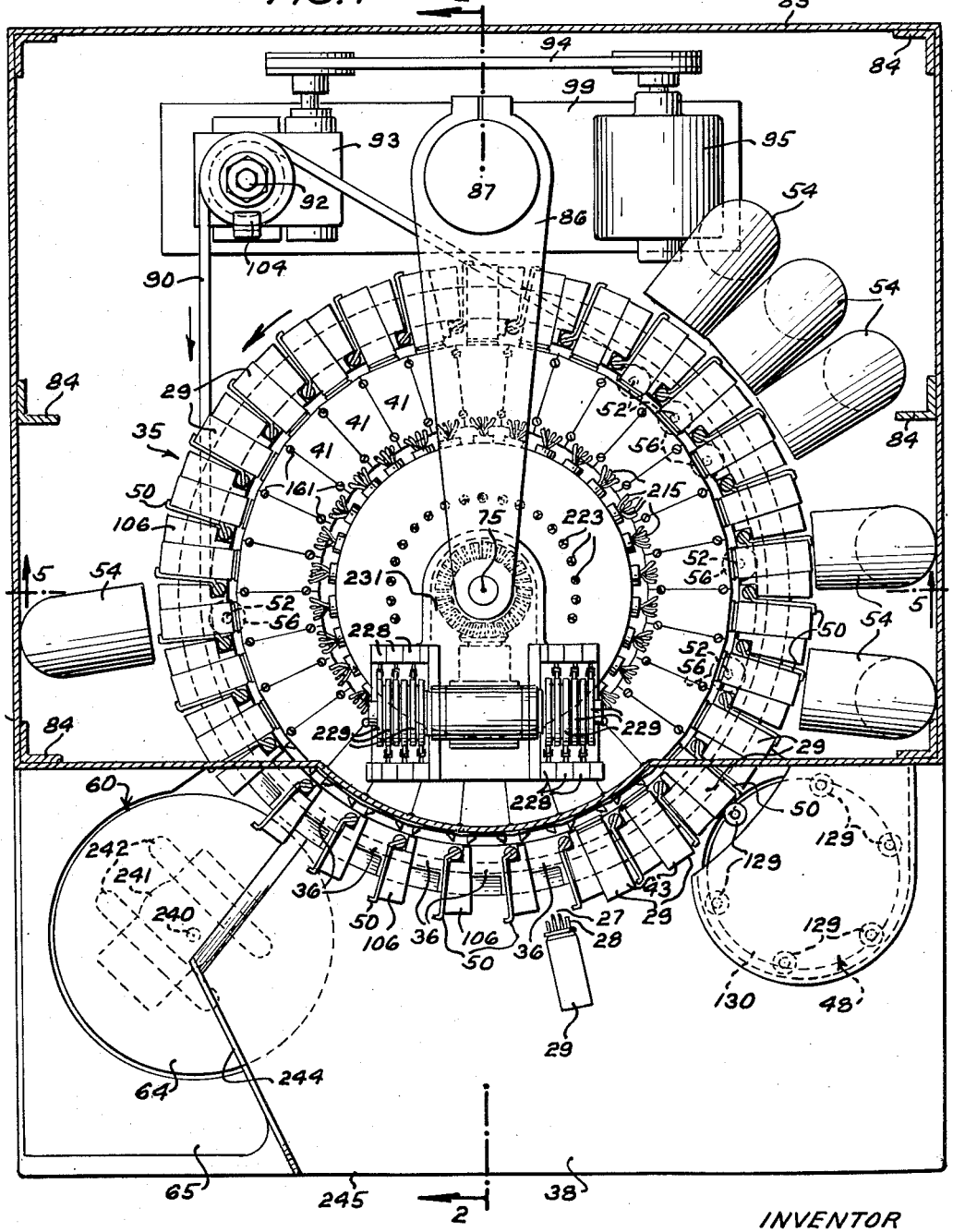

Figs. 16 and 17 are plan sectional views through the fixture taken on the line 16—16 and 17—17, respectively, of Fig. 14 showing an article in operative position in each; and Fig. 18 is an enlarged fragmentary plan sectional view through the ejector member.

This machine is designed to test condensers and/or networks by sequentially connecting them to electrical testing circuits for testing the various electrical characteristics thereof, such as breakdown, capacity defects, network resistance defects, and insulation resistance, and to sort the condensers and/or networks according to their defects or non-defects. These condensers or networks are enclosed in rectangular metal containers or cans 25 (Figs. 3 and 4), each of which is closed by a wall or closure 26 of insulating material apertured to accommodate the terminals 27 extending therethrough and connected to the condensers or networks and in some types of constructions to accommodate mounting studs 28. The metal containers 25 are of predetermined uniform length and width and their thickness varies according to the number of condensers and/or networks contained therein. The number of terminals 27 varies, ranging from 2 to 4, and the arrangement thereof, likewise, varies, depending upon the number of condensers or networks in the container. For purposes of convenience in description, the condenser and network units and the container therefor will hereinafter be referred to as an article 29.

Generally, the apparatus comprises a continually rotating turret or table 35 (Figs. 1 and 2) having a plurality of article holders 36 for receiving the articles 29 and carrying them through a predetermined circular path of less than one complete revolution. Each of the articles is slid manually from a stationary loading table 38 into the holders 36 and into engagement with the end of a U-shaped ejecting plunger 39 stressed for movement outwardly by a spring 40 and guided for reciprocable movement in a vertically adjustable fixture 41, which is rotatable with the turret 35. In this initial or inoperative position 43 of the article 29 in the holder 36 (Figs. 1, 6 and 9), the terminals 27 are spaced from contact springs 46 stressed for vertical movement toward each other and spread apart in response to the outward or ejecting movement of the plunger 39 by a spreader cam 47 mounted thereon. As the article is carried along by the turret, it is engaged by a pusher mechanism 48 (Figs. 1, 6 and 10) and forced thereby radially inwardly to a second or operative position in the holder. In moving inwardly, the article imparts a movement radially inwardly to the plunger 39 to effect the closing movement of the contact spring 46 into engagement with the terminals 27 of the article. While the article is held in its forward or operative position by the pusher mechanism 48, a latch 50 associated with the holder 36 is actuated to engage the article and hold it in this position.

As the turret 35 is rotated, the contacts 46 and the articles 29 associated therewith are carried through a plurality of testing stations and are electrically connected to a plurality of testing circuits and the articles are subjected sequentially to various electrical tests.

An article 29, when it is defective and cannot pass a test applied to it, is ejected at the end of that test by a cam 52 (Figs. 1, 6 and 7) which actuates the latch 50 to release the article and permit the ejecting member 39 to eject the article radially outwardly from the holder and into a receiving chute 54 (Figs. 1 and 5). If the article passes the test applied to it, a solenoid 56 (Fig. 7) associated with the operative testing circuit is energized to move the cam 52 and render it inoperative and the article will continue its movement with the rotary table so that if the article is perfect or acceptable, it will be carried to an unloading station 60, where a stationary cam 62 (Figs. 12 and 13) actuates the latch to release the article and permit the plunger 39 to eject the article from the holder on the rotary table. At the unloading station, the articles are ejected radially onto a rotating turn table 64, which serves to move the articles out of the path of successive articles and permits the operator to slide them onto a stationary unloading table 65, from which they are later removed.

More specifically, the rotary table or turret 35 comprises an annular disc or supporting ring 70 (Figs. 1, 2, 5, 6 and 8) positioned on top of a cylindrical drum portion 71 having an annular web or disc portion 72 provided at its inner periphery with a hub 73. The hub 73 is fixed to a sleeve 74 (Figs. 2 and 5) rotatably mounted on a stationary shaft 75, the sleeve 74 having a shoulder 76 engageable with the shoulder 77 on the shaft for supporting the sleeve 74 thereon. The shaft 75, at its lower end, is secured in a supporting block 78 and, with the block 78, is fixed to a base plate or platform 79. The plate 79 is mounted on a plurality of longitudinal and transverse horizontal frame members 82, which, together with other horizontal and transverse frame members 83, are welded to a plurality of corner and intermediate vertical frame members 84, and constitute a skeleton framework of the machine. Metal sheets applied to the framework form walls 85, which enclose substantially the entire machine. The reduced upper end of the shaft 75 is supported against movement by one end of a stabilizer arm or bracket 86 extending transversely from the upper end of a stabilizer column or post 87, which, at its lower end, is rigidly secured to the base 79.

Rotation is imparted to the rotary table 35 by a pair of belts 90 (Figs. 1 and 2) encircling the drum 71 and connected to a drive pulley 91 operatively connected to a drive shaft 92 of a gear reducer 93. The gear reducer 93 is connected through a belt drive 94 to an electric motor 95, which, together with the reducer 93, is mounted on a bracket or platform 99 fixed to the post 87. The drive pulley 91 is slidably mounted on the shaft 92 and has a serrated clutch element 101 engageable with a complementary clutch element 102 secured to the drive shaft and is yieldingly held in operative engagement therewith by a spring 103. Thus, if an excessive load is applied to the drive pulley 91, the drive pulley 91 may slow down or stop and be caused to move upwardly by the drive clutch element 102, which upward movement of the drive pulley 91 serves to actuate a microswitch 104 to stop the motor 95.

The article holders 36 (Figs. 1, 2, 6, 8, 12 and 13) on the rotary table 35 are formed by a plurality of elongated tapering blocks or members 106 secured to the upper surface of the supporting ring 70 and projecting radially outwardly from the outer peripheral edge thereof. The articles 29 are guided for radial movement and against lateral movement by the radially extending wall 107 on one side of the holder and the portion 108 of the latch and the end of a pin 109 extending laterally from the blocks 106 and through apertures in the latches 50. The outer upper edge of the supporting ring 70 between the spaced blocks 106 is inclined at 110 (Fig. 8) to facilitate the insertion of the article into the holder 36. A recess is formed in each of the blocks 106 to provide clearance for pivot shafts 112, to the upper ends of which one end of each of the latches 50 is secured. The outer ends of the latches 50 are bent at right angles to form shoulders or hooks 113, which are engageable with the ends of the articles 29 to hold them in their operative position in the holders. The shafts 112 are journalled in apertures extending through the plate 70 and drum 71 and each shaft has fixed to its lower end a cam follower comprising an arm 115 secured at one end to the shaft and at its other end rotatably supporting a roller 116. Compression springs 118, mounted in recesses in the blocks 106, urge the latches into closed position in engagement with the article.

The stationary cam 62, which actuates the latches to their released or open position at the article unloading station 60, is formed on an annular member or cam ring 120 fixed to the upper end of a dished annular supporting bracket 121 secured to the stationary shaft 75. The cam 62 has a surface 122 concentric with the axis of the shaft 75, and which extends circumferentially from the discharge or unloading station 60 to a point adjacent the pusher mechanism 48 and serves to maintain the latches 50 in their open position while the holders 36 are in the loading zone and the articles are being loaded onto the turret. Adjacent the pusher mechanism 48, the cam surface 122 terminates and a roller 123 mounted on a bracket 124 in the path of the cam follower roller 116 serves to actuate the follower, as it passes by, and move the latch to its closed position, where it is effective to hold the article in its forward or operative position. The springs 118 act to retain the latches 50 in their closed position in engagement with the articles 29 and rollers 116 of the cam follower are positioned adjacent and substantially in engagement with an arcuate cam surface 125 concentric with the axis of the shaft which surface 125 serves to limit the inward movement of the follower and the rotary movement of the latch 50 when an article 29 is absent from the holder 36 during the rotation of the table 35.

The cam ring 120 also serves as a support for the movable cams 52 (Figs. 5, 6 and 7) and the solenoid cam actuators 56. The movable cams 52, cylindrical in shape, are vertically movable in apertures formed in the cam ring 120 and are normally maintained in their upper or operative position in the path of movement of the cam follower rollers 116 by springs 127 and are withdrawn downwardly to their inoperative position in response to the energization of the solenoid 56 associated therewith. Thus, the cams 52, which extend radially outwardly from the cam surface 125, serve, when in operative position, to actuate the cam follower 116 and move the latch 50 to its open position to permit the ejection of the article from the holder 36. When the solenoid 56 is energized, it retracts the cam 52 to its inoperative position and renders the cam ineffective to actuate the latches 50, as explained hereinbefore.

The pusher mechanism 48 (Figs. 1, 6, 10 and 11) for pushing the articles radially inwardly into their operative position in engagement with the contact members 46 and against the yielding pressure of the ejector 39 comprises a plurality of spaced pusher elements or rollers 129 rotatably mounted about their axes on a disc 130 fixed to the upper end of a shaft 131, which is rotatably journalled in a bearing member 132. The bearing 132 is formed in a mounting plate 133, which is mounted for sliding movement on a supporting plate 134 secured to a pair of spaced supporting brackets 135 extending from and fastened to the stationary support 121. The plate 133 is guided for limited radial movement by a pair of shouldered studs 137 positioned in radially extending guide slots 138 in the supporting plate 134. A sprocket 142 pinned to the shaft 131 is connected by a sprocket chain 143 to a sprocket 144, which, in turn, is keyed to a shaft 145 rotatably mounted in a bearing 146 formed on the supporting plate 134. A disc 147, keyed to the upper end of the shaft 145, has a plurality of equally spaced radially disposed slots 148, which are engageable by drive pins 149 extending downwardly in spaced relation to each other from the underneath surface of the annular plate 70 of the rotary table 35. Thus, the pins 149, moving with the rotatable table 35, engage in the slots 148 of the disc 147 and impart rotation thereto which, in turn, through the chain drive, imparts rotation to the disc 130 and pusher rollers 129. The pusher elements or rollers 129, being spaced equi-angularly about and equi-distant from the axis of the rotation of the disc 130, engage successive articles and move them radially inwardly on the turret from their initial or inoperative position to their inner or operative position against the yielding pressure of the ejecting members 39 to effect the engagement of the terminals 27 with the electrical contact members 46.

The disc 130 of the pusher mechanism 48 is capable of limited movement outwardly to accommodate articles of excessive length or other unusual conditions without damaging the pushing mechanism 48 and the disc 130 may be yieldingly maintained in its normal position by any suitable mechanism. As shown herein (Figs. 10 and 11), the chain 143 is engaged by a chain tightener sprocket 150 rotatably mounted on a lever 151 intermediate its ends. At one end, the lever 151 is pivoted at 152 to the fixed supporting plate 134 and at its other end the lever 151 is connected to one end of a contractile spring 153, the other end of which is adjustably secured to a post 154 on the supporting plate 134. Thus, this construction yieldingly retains the chain 143 taut about the drive sprockets 142 and 144 and yieldingly permits the radial movement outwardly of the shaft 131. If desired, the pusher mechanism 48 may be substantially enclosed in a housing or cover plate 155.

The fixtures 41 (Figs. 6, 8, 9 and 10) in which the contact members 46 and the ejector members 39 are mounted and which comprise elongated tapering units nested together in annular form are secured to an annular disc or supporting plate 160 by screws 161 (Fig. 5) fitting in aligned vertical grooves in the side diverging walls of the adjacent fixture units 41. Each fixture 41 is associated and radially aligned with an article holder 36 and contains two sets of contact members 46 and ejector plungers 39 arranged at two levels, one set in superposed relation to the other. One set of contacts 46 and ejector 39 as, for example, the upper one, is adapted to accommodate articles having studs 28, as disclosed in Fig. 3, and the other or lower set of contacts and ejector is adapted to be used for testing articles having end constructions as disclosed in Fig. 4.

The supporting plate 160 and the fixtures 41 are vertically adjustable to horizontally align the upper or lower set of contacts and ejectors with the holders 36 and also to adjust the position of the contacts and the ejectors of each set vertically relative to the holders when used in testing articles of different thicknesses. A plurality of rods 163, fixed at one end to the plate 160, extend downwardly through apertures in the disc portion 72 of the rotatable table 35 and are secured at their lower ends to an annular plate or ring 164. The plate 164 rests on an annular antifriction thrust member 166, slidably mounted for vertical movement on the sleeve 74 and supported on a plurality of thrust pins 167. The pins 167 are secured to and extend upwardly from an internally threaded nut 168 mounted in threaded engagement with an externally threaded sleeve 170, which, in turn, is mounted for rotation on the stationary shaft 75 and against axial movement. Formed on the lower end of the threaded sleeve 170 is a worm gear 171, which meshes with a worm 172 keyed to an operating shaft 173, which, in turn, extends forwardly from the machine through the front wall thereof and has an operating handle 175 at its forward end. By turning the handle 175 in the proper direction, the threaded sleeve 170 is rotated and the nut 168 is moved vertically, which movement is transmitted, through the non-rotatable pin 167, to the thrust bearing 166, and from the thrust bearing 166 to the rotatable plate 164 and pins 163 to the rotatable supporting plate 160 and the fixtures 41 to properly adjust either set of contacts 46 and ejectors 39 to the proper elevation relative to the articles 29 in the holders 36.

Each fixture 41, with its upper and lower compartments for the reception in each of one set of contacts and ejector members, comprises a housing formed in three sections secured in superposed relation by screws 183 and having upper, intermediate and lower horizontal wall portions 184, 185 and 186, respectively, and side walls 188—188. Guideways or slots 190 are formed in the side walls 188 for receiving and supporting ejecting plungers 39 for horizontal reciprocable movement and recesses 191 are provided in the fixture for receiving a plurality of blocks of insulation 193 forming a wall for supporting the contact members 46. The ejecting plunger 39 is U-shaped and, as previously described, is normally urged radially outwardly by the compression spring 40 interposed between the ejector 39 and the wall 193. The movement outwardly of the ejector 39 is limited by pins 196—196 engageable with the ends of slots 197—197 formed in the walls 188 of the fixture.

In the lower set of ejectors (Fig 17), the seats 200 are formed on the outer ends of the leg portions 199 and have angularly disposed guide surfaces 201 extending outwardly therefrom and are adapted to be engaged by the end portion of the article, which is positioned laterally on the seats by the inclined portions 201. In the upper set of ejectors 39 (Figs. 14 and 16), the seats 200, formed by the notches in the leg portions 199, are spaced from the ends of the plunger and are adapted to receive the studs 28 projecting from the article 29 of the type of construction shown in Fig. 3. The outer ends of the leg portions 199 are provided with inwardly directed inclined surfaces 202, which aid in guiding the studs 28 of the article into position on the seats 200.

To insure a positive contact between each of the studs 28 of the article and the plunger 39 in order to electrically ground each stud to the machine, one of the seats of the plunger is provided with a mechanism to compensate for a slight difference in length between the studs 28 of the article. The shoulder 203 Fig. 18, forming one of the seats, is positioned a greater distance from the end of the ejector plunger 39 than the other seat and a movable abutment member, in the form of a ball 204, is mounted in a bore 205 in the leg 199 of the plunger and normally projects beyond the shoulder 203. The abutment member 204, which is retained in the bore 205 by the converging side walls at the end of the bore, is urged outwardly by a spring 206, which is held compressed by a plug 207 retained in the bore 205 by the pin 196. Thus, when an article having studs 28 of slightly different lengths is moved into engagement with the seats of the plunger 39, one stud 28 will abut the regular seat 200 and the other stud 28, whether the short or long one of the two, will be engaged by the self-adjusting abutment member 204 associated with the other seat.

The cam or contact spreader member 47 is fastened to the intermediate or connecting portion of the U-shaped ejector by a screw 209, the end of which projects beyond the ejector and serves as a guide pin for the compression spring 40. The contact members 46, four in number for each set, are in the form of elongated flat spring members having inwardly directed end portions 210 engageable with the terminals 27 of the article 29. Rigidly supported at one end in the block 193 and disposed above and below the ejector 39, the contact members 46 are flexed for movement toward each other transversely to the direction of movement of the ejector member 42 and the article 29. Intermediate their ends, the contact springs 46 are provided with inclined offset or cam portions 211 engageable with the inclined portions of the cam members 47, and which portions 211 cooperate with the cam 47 to move the contacts 46 in a substantially vertical direction away from each other to a spread or open position, in response to the movement of the ejector outwardly to its normal extended position.

In response to the inward movement of the ejector 39, the cam member 47 will disengage itself from the contact springs 46 and permit the springs 46 to move toward each other to a closed position in engagement with the terminals 27 on the article. Thus, when an article 29 positioned in the holder 36 on the turret 35 is moved horizontally from an inoperative position to an operative position by the pusher mechanism 48, it moves the ejector plunger 39 radially inwardly from its normal extended position to its operative position and causes the contact springs 46 to move towards each other into engagement with the terminals 27, which are subsequently sequentially electrically connected through the contacts 46 to the various testing circuits. The inward movement of the ejector 39 also further compresses the compression spring 40 so that, upon disengagement of the latch 50 from the article 29, the ejector 39 is moved outwardly with a sudden or snap action to eject the article from the turret 35 and simultaneously therewith move the contact springs 46 to their open position.

Correspondingly positioned spring contacts in each pair of superposed sets of contacts 46 are electrically connected together by conductors 214 and by conductors 215 they are connected to brushes 216 mounted in a cylindrical brush holder 217, which, in turn, is secured to the rotary sleeve 74 for rotation therewith. The brushes 216 are arranged in four levels and the brushes of the different levels are connected to the different ones of the four terminals of each set of spring contacts 46. The brushes 216, as they rotate with the turret 35, are adapted to engage a plurality of stationary commutator segments 219 extending outwardly from the periphery of a plurality of annular commutator supporting discs 220 mounted on a sleeve 221 fixed to the stationary shaft 75. Conductors 223 connect the commutator segments 219 to various test circuits of the testing equipment 224, indicated diagrammatically in Fig. 5 as being located in the upper portion of the machine.

A plurality of microswitches 228 (Figs. 1 and 2), connected into the various test circuits of the testing equipment 224, are actuated by a plurality of circular cams 229 mounted for rotation with a cam shaft 230 to connect, in cooperation with the brushes and commutator segments, the various testing circuits to the articles and apply the aforementioned tests thereto for predetermined periods of time. The cam shaft 230 is journalled in a housing 231 mounted on the stationary shaft 75 and keyed to a worm 232, which meshes with a worm gear 233 keyed to a shaft 234. The shaft 234 is journalled in the housing 231 and carries at its other end a bevelled gear 235 which meshes with a bevelled drive gear 236 secured to the end of the rotatable sleeve 74.

As they are carried along by the rotatable table 35, the articles 29 pass through a plurality of testing stations or zones and are connected successively and for predetermined periods of time to the various testing apparatus and subjected to the various electrical tests to determine whether the values of certain electrical characteristics of the articles fall within or outside of an acceptable range. As disclosed herein, the apparatus applies six electrical tests to the articles and, as shown in Fig. 1, six chutes 54 are shown for receiving the articles ejected at the different stations. The angular distance or arcs between the ejecting chutes 54 indicate, generally, the extent of the last five test stations, the first test station extending a predetermined distance from the first chute toward the pusher mechanism 48.

During the initial portion of each breakdown test at each of the first three test stations, the article is connected through one commutator segment to one portion of a test circuit and is subjected to a predetermined voltage for a predetermined length of time, after which it is connected to another commutator segment to another portion of the test circuit, which is set to pass or accept the article if the value of the electrical characteristic being tested falls within the predetermined range. During the network resistance and capacitance tests at the fourth and fifth test stations, respectively, the article is connected through commutator segments to the respective network resistance and capacitance test circuits which are set to pass or accept the article if the value of the electrical characteristic being tested falls within the predetermined range.

Articles submitted to insulation resistance test at the last test station are first subjected to electrical conditioning by being connected to several sequential groups of commutator segments, some of which apply different voltages to the article before it reaches the insulation resistance test segment. The insulation resistance test segment connects the article to a circuit which is set to pass or accept the article if the value of the characteristics being tested falls within the predetermined range.

In each test station, at a point where the article nears the end of its movement therein, there is located one of the cams 52 and a solenoid 56, which is electrically connected into the testing circuit associated with the station. If the value of the electrical characteristic of the article being tested falls within the set minimum-maximum range of the test equipment applying the test, the solenoid 56 is energized to withdraw the cam 52 and render it inoperative and the latch 50 holding the article in its operative position in the holder is not actuated at this point to release the article. If the value of the characteristic of the article being tested falls below the minimum or above the maximum range of the setting of the testing apparatus testing the article, the solenoid 56 remains deenergized and the cam 52 remains in its normal operative position and engages the cam follower 116 to actuate the latch 50 and disengage it from the article, thus releasing the article and causing its ejection from the holder 38.

In radial alignment with the movable cam members 52 and the solenoid 56, in each test station, the open ends of receiving tubes or chutes 54 are positioned to receive the ejected articles and guide them into receptacles 238. The receptacles 238 are in the form of rectangular boxes or drawers slidably supported on guide members and removable from the machine through openings in the walls thereof. The rejected or imperfect articles 29 are thus sorted into groups according to their defects and the good or acceptable articles are carried by the rotatable table 35 to the unloading station 60, where, as previously mentioned, the stationary cam 62 actuates the latches 50 to release the articles 29, which are thereby ejected onto the continuously rotating turn table 64. The turn table 64 is mounted on a shaft 240 of an electric motor 241, which is supported by a pair of brackets 242 fixed to the underneath side of the unloading table 38. The ejected articles are carried by the turn table into engagement with a vertical wall 244 extending upwardly from the unloading table 65 and from one edge of the loading table 38 and forming a partition or barrier therebetween to prevent the articles from being moved accidentally from the loading table onto the unloading table. The turn table 64 and the unloading table 65 is located at a lower elevation with respect to the loading table 35, a portion of which overlies a portion of the turn table. The loading table 38 and the unloading table 65 are formed in the upper part of a forwardly projecting console portion 245 of the machine (Figs. 1 and 2).

The loading and unloading features of construction and the fixture construction of this apparatus are not claimed herein and form the subject matter of separate applications of S. V. Smith, Serial Nos. 45,386 and 45,387, being filed concurrently herewith. The latter application has since issued as Patent No. 2,488,609.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an article testing apparatus, a base, a stationary vertical shaft mounted on said base, a turret rotatably supported on said shaft and having a plurality of article holders for receiving articles therein, means for continuously rotating said turret to move the articles carried thereby through a plurality of testing stations, supporting means mounted for rotation with and for vertical movement relative to said turret, fixtures mounted on said supporting means in radial alignment with said article holders, an upper group of electrical contacts on each of said fixtures engageable with terminals on one type of said articles, a lower group of electrical contacts on each of said fixtures in vertical alignment with said upper group of contacts and engageable with terminals of another type of said articles, an annular thrust member mounted for vertical movement on said stationary shaft for rotatably supporting said supporting means, means including a nonrotatable nut mounted coaxially with said shaft for vertical movement relative thereto for supporting said annular thrust member, a threaded sleeve mounted for rotation and against axial movement on said shaft and threadedly engaging said nut, means for rotating said sleeve to effect the vertical adjustment of said fixtures relative to said holders to alternately align the upper and the lower groups of contacts with said holders, a plurality of testing circuits associated with said testing stations, means sequentially connecting said electrical contacts and the articles engaging said contacts to said testing circuits, means for ejecting an article at each testing station, and means under control of said testing circuits for rendering inoperative said means for ejecting said articles.

2. An apparatus for testing condensers comprising a rotary table having a plurality of holders for supporting said condensers in an arc, means mounting said table for rotation about a vertical axis, means for continuously rotating said table to move the condensers carried thereby through a plurality of testing stations, a first connector means for each holder radially aligned with the holder and comprising contacts engageable with the terminals on said condensers arranged in one pattern, a second connector means for each holder radially aligned with the holder and comprising contacts engageable with the terminals on said condensers arranged in another pattern, supporting means for supporting said first connector means and said second connector means in an arc in vertically spaced relation to each other and for rotary movement with said table and for vertical movement relative thereto, means for vertically adjusting said supporting means to alternately move said first connector means and said second connector means into alignment with the holders for engaging the contacts on the condensers carried thereby, testing circuits associated with said testing stations, means for sequentially electrically connecting said connector means to said testing circuits, and means under control of said testing circuits for causing the ejection of said condensers at said stations.

3. An apparatus for testing condensers comprising a rotary table having a cylindrical portion and a plurality of holders for supporting said condensers in an arc, means including a vertical shaft concentric with said cylindrical portion for supporting said table for rotation, drive means including a belt entrained around said cylindrical portion for continuously rotating said table and moving the condensers carried thereby through a plurality of testing stations, a supporting member, means mounting said supporting member for rotation with and for vertical movement relative to said rotary table, fixtures secured to said supporting member in an arc and in radial alignment with said holders, a first connector means and second connector means mounted in spaced vertical alignment relative to each other in each other on said fixtures, said first connector means comprising contacts engageable with terminals on said condensers arranged in one pattern and said second connector means comprising contacts engageable with terminals on said condensers arranged in another pattern, testing circuits associated with said testing stations, means for successively connecting said connector means to said testing circuits, means for ejecting said articles at each testing station, and means under control of said testing circuits for rendering inoperative said means for ejecting said articles.

4. An apparatus for testing condensers comprising a base, a stationary shaft vertically disposed on said base, a sleeve mounted for rotation on said shaft, a rotatable table secured to said sleeve and having a cylindrical portion coaxial with said sleeve, a plurality of holders mounted on said rotatable table for receiving said condensers, drive means including a belt entrained around said cylindrical portion for continuously rotating said table and said sleeve, an annular supporting member mounted on said table for rotation therewith and for vertical movement relative thereto, fixtures mounted on said supporting member in radial alignment with said holders, two groups of electrical contacts mounted on each of said fixtures in spaced vertical relation to each other and adapted to engage terminals on condensers supported in said holders, means for vertically adjusting said supporting member to alternately move said groups of contacts into inoperative position in alignment with said holders to engage terminals on condensers supported therein, a plurality of testing circuits, a plurality of commutator segments electrically connected to said testing circuits, a stationary support fixed to said shaft for supporting said commutator segments, a plurality of brushes electrically connected to said groups of electrical contacts, a brush holder mounted on said sleeve for rotation with said table and adapted to move said brushes into and out of engagement with said commutator segments to sequentially connect said electrical contacts and the articles associated therewith to the testing circuits, and means for ejecting an article from said rotatable table when said article fails to pass an electrical test applied to it.

5. In a condenser testing apparatus, a base, a shaft mounted on said base, a carrier rotatably supported on said shaft and having a cylindrical wall concentric with said shaft, a plurality of holders mounted at one level on said carrier for receiving the condensers to be tested, drive means including a drive pulley and a belt entrained about said pulley and said cylindrical wall for continuously rotating said carrier, upper connector means for each of said holders disposed horizontally on one level and comprising contacts engageable with the terminals of one type of said condensers, lower connector means for each of said holders disposed at another level and in vertical alignment with said upper connector means, said lower connector means comprising contacts engageable with terminals of another type of said condensers, supporting means mounting said upper connector means and said lower connector means for rotary movement with said turret and for vertical movement relative to said turret, adjustable means operable to vertically adjust said supporting means for alternately moving said upper connector means and said lower connector means into an operative position in horizontal alignment with condensers positioned in said holders for engaging terminals on said condensers, a plurality of commutator segments, means mounting said commutator segments in a predetermined fixed cylindrical arrangement about said shaft, a plurality of brushes mounted for rotation with said turret and sequentially engageable with said commutator segments, flexible conductors electrically connecting said brushes to said upper and said lower contacts, and testing circuits connected to said commutator segments.

6. In an apparatus for testing condensers the combination of a rotary table having a plurality of holders arranged in a circle for supporting said condensers, means mounting said table for rotation about a substantially vertical axis, drive means for continuously rotating said table to move the condensers carried thereby through a plurality of testing stations, a first connector means for each holder comprising contacts engageable with terminals on condensers arranged in one pattern, a second connector means for each holder comprising contacts engageable with terminals on condensers arranged in another pattern, supporting means for supporting said first connector means and said second connector means in a circle in spaced vertical relation to each other and in radial alignment with said holders and for rotary movement with said table and for vertical movement relative thereto, means for vertically adjusting said supporting means to selectively move said first connector means or said second connector means into an operative position in alignment with the holders for engaging the contacts on the condensers carried thereby, testing circuits associated with said testing stations, and means for sequentially electrically connecting said connector means to said testing circuits.

SCOTT V. SMITH.

REFERENCES CITED

The following references are of record in the file of this patent:

UNITED STATES PATENTS

| Number | Name | Date |
|---|---|---|
| 681,476 | Flautt | Aug. 27, 1901 |
| 1,808,301 | Ferguson | June 2, 1931 |
| 2,016,455 | Purdy | Oct. 8, 1935 |
| 2,270,613 | Young | Jan. 20, 1942 |
| 2,431,519 | Stoate | Nov. 25, 1947 |